United States Patent
Green

(10) Patent No.: US 10,547,882 B2
(45) Date of Patent: Jan. 28, 2020

(54) SYSTEMS AND METHODS FOR GENERATING CONCATENATED TRANSPORT STREAMS FROM ADAPTIVE MEDIA STREAMS

(71) Applicant: Dish Technologies L.L.C., Englewood, CO (US)

(72) Inventor: Don Green, Highlands Ranch, CO (US)

(73) Assignee: DISH TECHNOLOGIES LLC, Englewood, CO (US)

( * ) Notice: Subject to any disclaimer, the term of this patent is extended or adjusted under 35 U.S.C. 154(b) by 265 days.

(21) Appl. No.: 13/780,632

(22) Filed: Feb. 28, 2013

(65) Prior Publication Data
US 2014/0189765 A1 Jul. 3, 2014

Related U.S. Application Data

(60) Provisional application No. 61/747,851, filed on Dec. 31, 2012.

(51) Int. Cl.
*H04N 21/2365* (2011.01)

(52) U.S. Cl.
CPC .............................. *H04N 21/2365* (2013.01)

(58) Field of Classification Search
None
See application file for complete search history.

(56) References Cited

U.S. PATENT DOCUMENTS

| | | | |
|---|---|---|---|
| 2003/0061619 A1* | 3/2003 | Giammaressi | H04N 7/17318 725/95 |
| 2003/0149975 A1* | 8/2003 | Eldering | H04N 7/17318 725/34 |
| 2004/0010613 A1* | 1/2004 | Apostolopoulos et al. | 709/231 |
| 2007/0165628 A1* | 7/2007 | Choi et al. | 370/389 |
| 2008/0155632 A1* | 6/2008 | Marilly | H04N 7/17318 725/114 |
| 2009/0060028 A1* | 3/2009 | Liu | H04N 21/43615 375/240.01 |
| 2010/0077060 A1* | 3/2010 | Oz | H04N 21/2225 709/219 |
| 2011/0162024 A1* | 6/2011 | Jagadeesan et al. | 725/110 |
| 2011/0231872 A1* | 9/2011 | Gharachorloo et al. | 725/28 |
| 2012/0166628 A1* | 6/2012 | Kullos | H04L 41/5016 709/224 |

(Continued)

*Primary Examiner* — Samira Monshi
(74) *Attorney, Agent, or Firm* — Lorenz & Kopf LLP

(57) ABSTRACT

Embodiments of a method executable by an adaptive stream concatenation server to deliver a concatenated transport stream to a video distribution system are provided, as are embodiments of adaptive stream concatenation servers. In one embodiment, the method includes receiving an adaptive media stream containing television programming in an adaptive packet format at the adaptive stream concatenation server via a digital network. The contents of the adaptive media stream are concatenated by the adaptive stream concatenation server to create a concatenated transport stream containing the television programming in a streaming format different from the adaptive packet format and compatible with the video distribution system. The concatenated transport stream containing the television programming is then transmitted in the streaming format to the video distribution system.

18 Claims, 2 Drawing Sheets

(56) References Cited

U.S. PATENT DOCUMENTS

Figure 1:
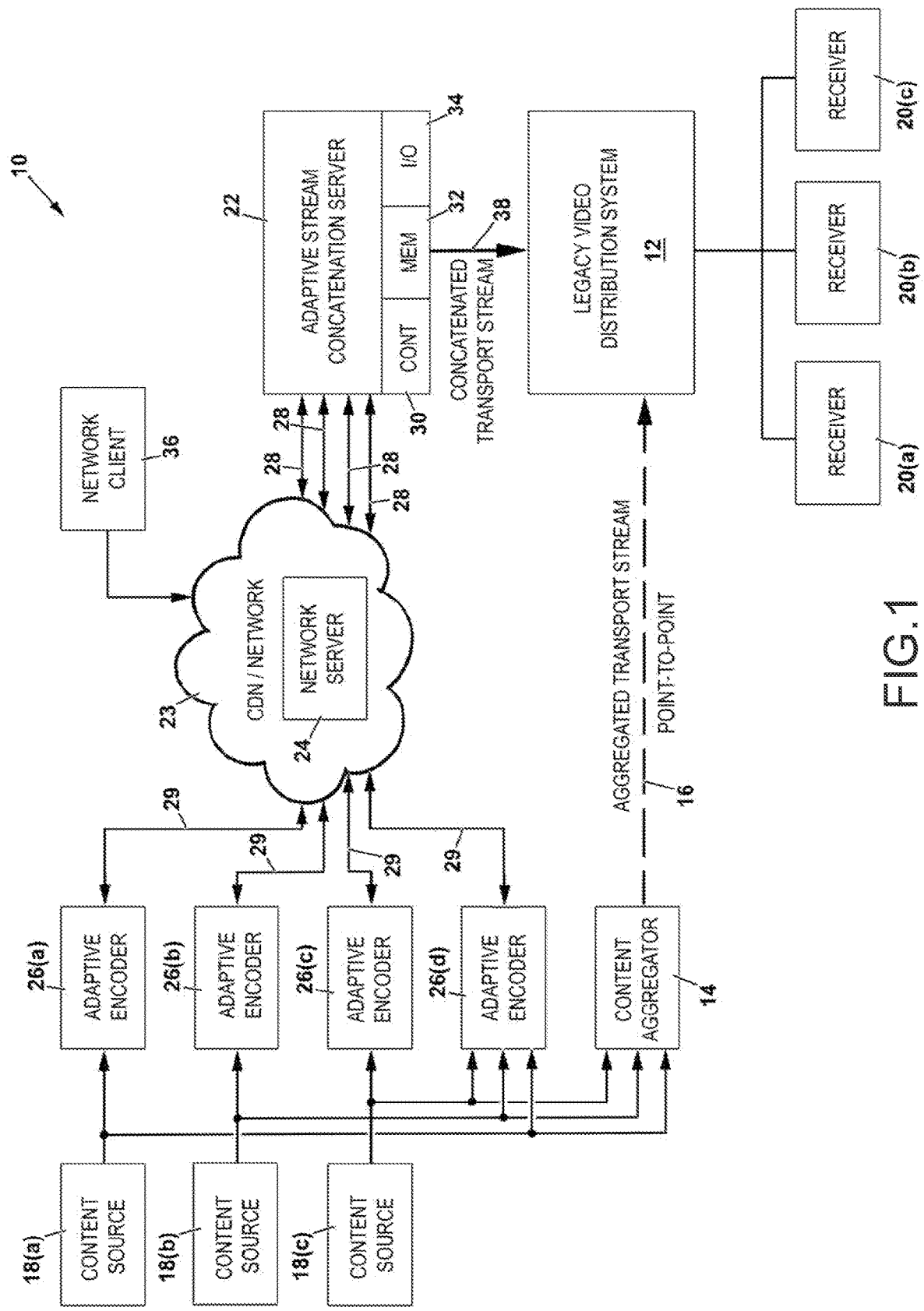

| | | | |
|---|---|---|---|
| 2013/0091249 A1* | 4/2013 | McHugh | H04N 21/23439 |
| | | | 709/219 |
| 2013/0166580 A1* | 6/2013 | Maharajh et al. | 707/758 |
| 2013/0179590 A1* | 7/2013 | McCarthy et al. | 709/231 |
| 2013/0262693 A1* | 10/2013 | Phillips et al. | 709/231 |
| 2013/0312046 A1* | 11/2013 | Robertson et al. | 725/93 |
| 2014/0056426 A1* | 2/2014 | Ducharme | H04N 21/2347 |
| | | | 380/210 |

* cited by examiner

SYSTEMS AND METHODS FOR GENERATING CONCATENATED TRANSPORT STREAMS FROM ADAPTIVE MEDIA STREAMS

RELATED APPLICATION(S)

This application claims priority to provisional U.S. Patent Application Ser. No. 61/747,851, filed with the USPTO on Dec. 31, 2012, the entire contents of which are hereby incorporated by reference.

TECHNICAL FIELD

The present disclosure generally relates to adaptive media stream systems and, more particularly, relates to systems and methods wherein concatenated transport streams for distribution to a number of television receivers or other devices are generated from adaptive media streams received over a digital network.

BACKGROUND

Many service providers continue to utilize legacy video distribution systems to transmit television programming content to relatively large numbers of television receivers, such as set-top boxes located in the guest rooms of a resort or similar venue. The television programming may be received as an aggregated transport stream at the service provider's distributor headend. The aggregated transport stream may be provided by a content aggregator, which produces the transport stream by bundling a number of component streams containing the television programming. In instances wherein the service provider is remotely located relative to the content aggregator, a privately-owned point-to-point connection, such as a fiber optic circuit, may be utilized to transmit the aggregated transport stream from the content aggregator to the distributor headend. Leasing of such a privately-owned point-to-point connection can be costly and potentially cost prohibitive for smaller service providers. In certain cases, it may be possible to bypass the privately-owned point-to-point connection by wirelessly transmitting the transport stream directly to the distributor headend utilizing a satellite link. However, this may not be possible or desirable in all instances, such as when the distributor headend is located outside of the satellite footprint cast by the content provider or its affiliates.

Transport stream delivery architectures of the type described above are limited in another respect, as well; such delivery architectures are typically incompatible with emerging adaptive streaming technologies. During adaptive streaming, media content may be encoded into multiple sets of small segment files commonly referred to as "streamlets." The streamlets are encoded to different parameters (e.g., different frame rates, bit rates, resolutions, and the like) such that a particular terminal device can request a lower or higher bandwidth stream depending upon the capabilities of the terminal device and resource allocation. As changes in network bandwidth or other factors occur, the terminal device is able to react to such changes by requesting future segments or streamlets encoded in accordance with varying parameters thereby providing a readily adaptable and highly reliable stream for viewing of the media content. The usage of such adaptive streaming techniques is, however, generally not possible in the case of legacy video distribution systems without upgrading existing set-top boxes or other television receivers to enable the installation of adaptive clients thereon, which is typically cost prohibitive or otherwise impractical in many instances wherein a large number of set-top boxes have already been deployed.

It is therefore desirable to provide systems and methods enabling the delivery of a transport stream to the video distribution system of a service provider without requiring the transmission of data over privately-owned point-to-point connections, such as fiber optic circuits, and without requiring upgrades in the existing equipment utilized by the service provider. It would further be desirable for such systems and methods to utilize adaptive stream technologies in the generation of such transport streams to enable the efficient resource management of the distribution system and reliable media streaming, while also allowing media streams to be multicast to any number of existing television receivers. Finally, it would still further be desirable to provide systems and method for generating concatenated transport streams from adaptive media streams received over a digital network wherein the concatenated transport stream can also be transmitted to legacy television receivers or other devices within a home environment. These and other desirable features and characteristics will become apparent from the subsequent Detailed Description and the appended Claims, taken in conjunction with the accompanying Drawings and this Background section.

BRIEF SUMMARY

Embodiments of a method executable by an adaptive stream concatenation server to deliver a concatenated transport stream to a video distribution system are provided. In one embodiment, the method includes receiving an adaptive media stream containing television programming in an adaptive packet format at the adaptive stream concatenation server via a digital network. The contents of the adaptive media stream are concatenated by the adaptive stream concatenation server to create a concatenated transport stream containing the television programming in a streaming format different from the adaptive packet format and compatible with the video distribution system. The concatenated transport stream containing the television programming is then transmitted in the streaming format to the video distribution system.

In a further embodiment, the method is executable by an adaptive stream concatenation server to deliver a concatenated transport stream to a television distribution system distributing a multi-channel television content or programming, such as cable television content, to a plurality of television receivers. The method includes receiving a plurality of adaptive media streams each containing different television channels in an adaptive packet format at the adaptive stream concatenation server via a digital network The contents of the plurality of adaptive media streams are concatenated at the adaptive stream concatenation server to create a multicast Internet Protocol ("IP") stream containing a multi-channel television programming in a streaming format different from the adaptive packet format and compatible with the video distribution system. The multicast IP stream containing the multi-channel television programming is then encrypted and transmitted in the streaming format to a headend distributor of the television distribution system for distribution to the plurality of television receivers.

Embodiments of an adaptive stream concatenation server are further provided. The adaptive stream concatenation server provides television programming for distribution to a plurality of television receivers. In one embodiment, the adaptive stream concatenation system comprises an interface to a digital network and a processor coupled to the interface. The processor is configured to: (i) receive an adaptive media stream containing television programming in an adaptive packet format at the adaptive stream concatenation server via a digital network; (ii) concatenate the contents of the adaptive media stream by the adaptive stream concatenation server to create a concatenated transport stream containing the television programming in a streaming format different from the adaptive packet format and compatible with the video distribution system; and (iii) transmit the concatenated transport stream containing the television programming in the streaming format to the video distribution system.

BRIEF DESCRIPTION OF THE DRAWING FIGURES

Figure 2:
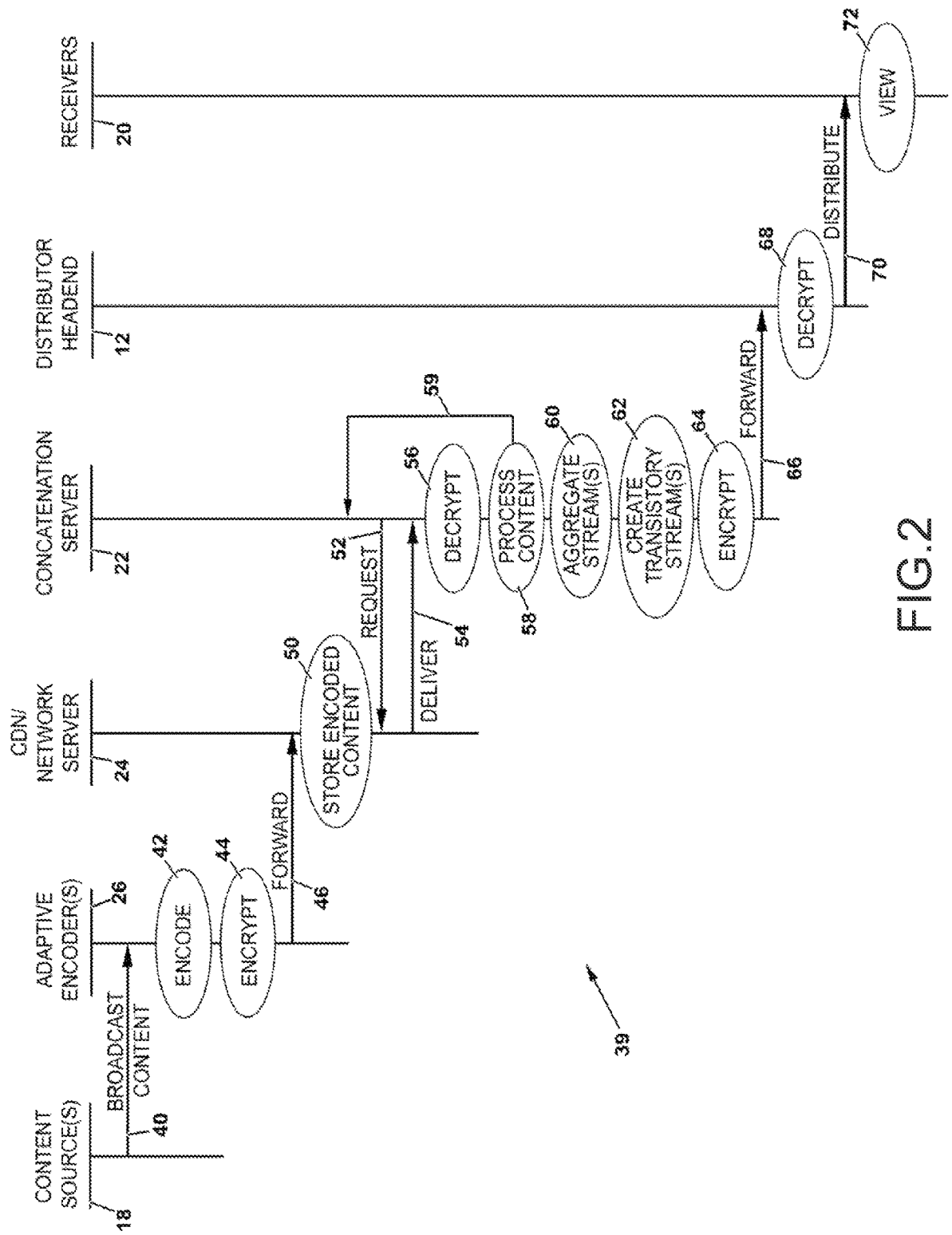

Exemplary embodiments will hereinafter be described in conjunction with the following drawing figures, wherein like numerals denote like elements, and:

FIG. 1 is a block diagram of an exemplary content delivery system, including an adaptive stream concatenation server, for generating concatenated transport streams from at least one adaptive media stream received over a digital network and transmitting the concatenated transport streams to the video distribution system of a service provider; and FIG. 2 is a message flow diagram showing an exemplary process that may be carried-out by the content delivery system shown in FIG. 1 in the generation and transmission of concatenated transport streams to a remotely-located video distribution system.

For simplicity and clarity of illustration, the drawing figures illustrate the general manner of system architecture and/or operation and may omit depiction, descriptions, and details of well-known features and techniques to avoid unnecessarily obscuring the exemplary and non-limiting embodiments of the invention described in the subsequent Detailed Description.

DETAILED DESCRIPTION

The following Detailed Description of the invention is merely exemplary in nature and is not intended to limit the invention or the application and uses of the invention. The following Detailed Description is merely exemplary in nature and is not intended to limit the invention or the application and uses of the invention. Any implementation described herein as exemplary is not necessarily to be construed as preferred or advantageous over other implementations. Furthermore, there is no intention to be bound by any theory presented in the preceding Background or the following Detailed Description.

Embodiments of the present invention provide systems and methods enabling the delivery of encoded, segmented, and encrypted adaptive media streams to service providers utilizing legacy video delivery systems. Embodiments of the system may be implemented, at least in part, as an Adaptive Stream Concatenation ("ASC") server, which functions essentially as a global network client for a number of legacy set-top boxes or other television receivers deployed by the service provider. The ASC server enables content delivery over an open Content Delivery Network ("CDN"), the Internet, or another digital network while interfacing with existing network devices and television receivers serviced by the service provider. More specifically, embodiments of the ASC server described herein can be utilized with existing or legacy cable television ("TV"), Internet Protocol Television ("IPTV"), and similar delivery networks currently utilized by service providers. Utilizing the systems and methods described herein, television programming content can be provided to local markets or venues without requiring leasing of a privately-owned fiber optic lines or other point-to-point delivery means to reduce data transport costs. Additionally, the television programming content can be transmitted to the content provider without requiring changes in hardware, such as upgrades the set-top boxes or other television receivers deployed by the service provider. As a result, the service provider can avail itself of the benefits of adaptive streaming technologies even when deploying a legacy delivery system, such as an RF Quadrature Amplitude Modulation ("QAM") or IP network, including set-top boxes or other terminal devices incapable of functioning as individual adaptive clients.

FIG. 1 is a schematic of a content delivery system 10, as illustrated in accordance with an exemplary and non-limiting embodiment. Content delivery system 10 includes a legacy video delivery system 12, which is operated by a service provider and which receives an aggregated transport stream 16 from a content aggregator 14 operated by or affiliated with a content provider. In one embodiment, the content delivery system is a cable television system or other television distribution system. The aggregated transport stream 16 comprises a number of component streams, which are received from a number of content sources 18 and combined into the aggregated transport stream 16 by content aggregator 14. In particular, each content source 18 may provide at least one encoded audio and video component stream to content aggregator 14. The component streams contain television programming and may collectively comprise a number of cable television channels of the type conventionally-viewed utilizing a set-top box or similar television receiver connected to a display.

After receiving the various component streams from content sources 18, content aggregator 14 combines the component streams with other streaming data, such as packet identification data, into the final aggregated transport stream 16 utilizing a transport stream multiplexer. MPEG-2 transport stream format or any other standardized format may be employed. Legacy video delivery system 12 then distributes the aggregated transport stream 16 to a number of television receivers 20. Television receivers 20 can assume the form of any terminal device suitable for receiving media content and providing appropriate output video signals for viewing the media content on a suitable display. The video output signals provided by television receivers 20 may be formatted in accordance with conventionally-known standards, such as S-video, High-Definition Multimedia. Interface ("HDMI"), Sony/Philips Display Interface Format ("SPDIF"), Digital Visual Interface ("DVI"), or IEEE 1394 standards. In one embodiment, television receivers 20 are set-top boxes, which may be distributed throughout the guest rooms of a resort or similar venue. In the illustrated example, content delivery system 10 includes three content sources 18(a)-(c) and three television receivers 20(a)-(c); however, it will be appreciated that system 10 may include any number of content sources 18 and television receivers 20 in a given implementation.

With continued reference to FIG. 1, content aggregator 14 may transmit the aggregated transport stream 16 over a point-to-point connection, such as a privately-owned fiber optic circuit. As explained in the foregoing section entitled "BACKGROUND," such a privately-owned point-to-point connection must typically be leased, which can be undesirably costly and potentially cost prohibitive. In certain cases, it may be possible to bypass the privately-owned connection by wirelessly transmitting the transport stream to the distributor headend of video distribution system 12 utilizing a satellite link. However, this may not be always be possible or desirable in all instances, such as when the service provider is a remotely-located resort and the distributor headend is located outside of the content provider's satellite footprint. It may also be possible to avoid the usage of a privately-owned connection by replacing existing legacy television receivers 20 with more advanced receivers capable of directly receiving streaming media content, such as multicast stream transmitted utilizing conventional Internet Protocols. However, this again may be undesirably costly or otherwise impractical in many instances. Therefore, to enable delivery of content without utilizing a point-to-point connection, content delivery system 10 further includes an Adaptive Stream Concatenation ("ASC") server 22 able to communicate with content sources 18 over a digital network 23 and/or a network server 24, which may store content provided by sources 18 in accordance with adaptive media streaming practices, as described more fully below.

The media content provided by content sources 18 may be delivered to one or more adaptive encoders 26. For example, content sources 18(*a*)-(*c*) may each communicate with a different adaptive encoder 26(*a*)-(*c*), which each generates a different adaptive stream consisting of the multiple sets of small encoded segment files or "streamlets." Each encoder 26 may be, for example, a digital computer system programmed to create multiple streams each representative of one or more particular media programs. In many cases, the streamlets are encoded such that segments of different streams can be interchanged to provide seamless playback even as network conditions or other resources change. Alternatively, content sources 18(*a*)-(*c*) may communicate with a single adaptive encoder 26(*d*), which generates a single coded adaptive stream consisting of multiple component streams. Any currently-known or later-developed packetized format can be utilized including MPEG, QUICKTIME, WINDOWS MEDIA, and/or other formats suitable for transmission over network 23. Several examples of adaptive streaming systems and techniques are described in US Patent Publication No. 2008/0195743, filed Feb. 9, 2007, and entitled "APPARATUS, SYSTEM, AND METHOD FOR MULTI-BITRATE CONTENT STREAMING," the entire contents of which are hereby incorporated by reference.

Digital network 23 can be any network over which one or more adaptive streams can be received including, but not limited to, an open CDN, the Internet, or any other digital network based upon TCP/IP or other conventional protocols. Network 23 as illustrated in FIG. 1, then, is intended to broadly encompass any digital communications network(s), systems, or architectures for transmitting data between the various components of system 10. Digital network 23 includes at least one network server 24, which may store media content provided by encoders 26 encoded to different parameters. During the below-described process, bi-directional communication may occur between ASC server 22 and network server 24 such that adaptive encoders 26 continually provide network server 24 with content containing the same video/audio segments, but encoded to different parameters; network server 24 saves such a library of content; and ASC server 22 requests packetized data encoded to particular parameters from network server 24, as indicated in FIG. 1 by double headed arrows 28. Alternatively, ASC server 22 may transmit requests for low, high, or intermediate bandwidth directly to encoders 26 through network 24, as indicated in FIG. 1 by double headed arrows 29. As further indicated in FIG. 1, any number of additional network clients 36 may also be able to communicate with adaptive encoders 26(*a*)-(*d*) and/or with network server 24 through digital network 23 to receive adaptively streamed digital media content.

Encoders 26 thus each provide multiple multicast streams of at least one television program or event having different encoding parameters, such as a varying bit rate, frame rate, resolution, or the like. For example, each program may be simultaneously multicast as a high bandwidth stream, a low bandwidth stream and/or any number of intermediate bandwidth streams. Client media players, such as network client 36, can thus simply select the program stream having the best set of parameters for current playback conditions. For example, if significant lag in programming playback should occur, the media player can switch to a lower bandwidth stream, such as a stream having lower bit rate, frame rate, resolution and/or other parameters). Conversely, when conditions are support a higher bandwidth stream, then the player can adaptively switch to a different stream that contained the same programming encoded with different parameters. As noted above, ASC server 22 may communicate with network server 24, adaptive encoders 26(*a*)-(*c*) and/or encoder 26(*d*) by sending requests to vary encoding parameters (e.g., bit rates, frame rates, resolutions, etc.) depending upon the current resources of server 22, video distribution system 12, and/or television receivers 20.

ASC server 22 can be implemented utilizing any combination of hardware, software, firmware, and the like capable of executing the operations described herein. As shown in FIG. 1, ASC server 22 will typically include at least one controller 30 operatively coupled to a number of volatile and/or non-volatile memory elements (identified collectively as "memory 32" in FIG. 2) and any number of input and output terminals 34, including an interface to digital network 23. Controller 30 can include any suitable number of individual microprocessors, microcontrollers, digital signal processors, programmed arrays, and other standard components known in the art. Controller 30 may include or cooperate with any number of software or firmware programs designed to carry out the various methods, process tasks, calculations, and control/display functions described herein. In many embodiments, controller 30 will execute an operating system during operation of ASC server 22 to assist the various programs executing on server 22 to access the hardware features thereof. Memory 32 will typically include a central processing unit register, a number of temporary storage areas, and a number of permanent storage areas. Memory 32 can also include one or more mass storage devices, such as magnetic hard disk drives, optical hard disk drives, flash memory drives, and the like.

Embodiments of ASC server 22 can be utilized with current major adaptive platforms, such as Move Networks®, Apple Hypertext Transfer Protocol ("HTTP") Life Streaming® ("HLS"), Microsoft Smooth Streaming®, and Adobe Flash®, as well as future adaptive platforms. In preferred embodiments, subscriptions are obtained for ASC server 22 to gain access to the playlist files for multiple, simultaneously-received media streams and, specifically, the HTTP-delivered streamlets making-up the adaptive streams for each channel. ASC server 22 then decrypts, concatenates, and encapsulates the transport stream in the below-described manner to provide a concatenated transport stream, which is then transmitted to legacy video distribution system 12, as indicated in FIG. 1 by arrow 38. The transport stream may comprise a cable TV signal made-up of a number of TV channels, each received in an adaptive packetized form over digital network 23. Transmission of the transport stream may be performed utilizing any suitable wireless connection, hard line or cable, or combination thereof. Video distribution system 12 then decrypts the media stream and distributes the digital media content to television receivers 20(a)-(c) in essentially the same manner as when receiving aggregated transport stream 16 over a point-to-point connection. The digital media content may assume the form of, for example, RF signals transmitted through coaxial cable or pulsed signals transmitted through fiber-optic cables. In this manner, legacy video distribution system 12 provides media content (e.g., cable TV programming) to television receivers 20(a)-(c) without changes in equipment or system architecture of video distribution system 12 and receivers 20, and while benefiting from improvements in reliability and resource management provided by adaptive streaming.

FIG. 2 is a message flow diagram showing an exemplary process 39 that may be carried-out by the content delivery system shown in FIG. 1 in the generation and transmission of a concatenated transport stream. To initiate process 39, at least one content source 18 broadcasts media content as a number of components streams, including an audio stream and a video stream, to at least one adaptive encoder 26 (FUNCTION 40). The adaptive encoder or encoders then encode the media content (FUNCTION 42) and, if desired, encrypts the content (FUNCTION 44) before forwarding the encrypted content to network server 24 (FUNCTION 46). ASC server 22 then transmits requests to network server 24 for the encoded content, as encoded to a particular set of parameters (FUNCTION 52). The requests may utilize conventional hypertext transport protocol (HTTP) constructs, which are readily routable on network 23 and which can be served by conventional CDN or other web-type server, such as network server 24 shown in FIG. 1. In response to this request, network server 24 delivers the encoded content, specifically the television programming, in an adaptive packet format of the type described above (FUNCTION 54).

Upon receipt of the adaptively-streamed digital media content, ASC server 22 decrypts and processes the content (FUNCTIONS 56 and 58, respectively). As ASC server 22 processes the content, ASC server 22 may continually update its requests pertaining to the parameters to which the received content is encoded to provide the above-described adaptive functionality, as indicated in FIG. 2 by arrow 59. ASC server 22 further aggregates the streams (FUNCTION 60); and then creates a transitory stream (FUNCTION 62). More specifically, after decrypting the streamlets for each channel, if necessary, ASC server 22 decrypts then concatenates the channel-specific, decrypted streamlets into a concatenated transport stream formatted as, for example, a MPEG2 transport stream. ASC server 22 may then encapsulate the transport stream as, for example, a multicast IP stream in accordance with a predetermined standardized protocol, such as a User Datagram Protocol ("UDP") or Real-time Transport Protocol ("RTP") schemes. ASC server 22 next encapsulates the television programming, encrypts the encapsulated programming (if desired), and then distributes the programming to legacy video distribution system 12 (FUNCTION 66). If radiofrequency ("RF") delivery is employed in an embodiment wherein video distribution system 12 is a cable television system or other television distribution system, ASC server 22 may also modulate the programming prior to transmission to the cable television headend associated with the television distribution system.

After receiving the transport stream from ASC server 22 (FUNCTION 66), distribution system 12 decrypts the concatenated transport stream (FUNCTION 68) and then provides the decrypted stream to television receivers 20 (FUNCTION 70), which permit end users to view the media content utilizing televisions or other displays connected to receivers 20 in the typical manner (FUNCTION 72). As noted above, the concatenated transport stream preferably contains multi-channel television programming or content, and distribution system 12 can be any system suitable for distributing such content to a plurality of television receivers or other devices. For example, the multi-channel television programming contained within the concatenated transport stream can be distributed to the television receivers or the like by cable television systems that commonly deliver programming via hybrid/co-axial fiber cable networks, as well as by IPTV systems that commonly deliver programming content via fiber and/or twisted pair copper cable networks. It should be generally appreciated, then, that ASC server 22 can serve any system or network capable of distributing multi-channel television programming or content including cable television systems, IPTV systems, satellite systems, and wireless delivery networks, whether currently known or later developed. Furthermore, while the media streams can be encrypted when transmitted from adaptive encoders 26 to network server 24 and/or from network server 24 to adaptive stream concatenation server 22, as described above, this need not always be the case; however, such encryption may desirable to prevent unauthorized access to the television programming, especially when the television programming contains premium content, such as premium cable television networks (e.g., HBO®) and/or pay-per-view movies and the like typically viewable as individual fee-based private telecasts.

The foregoing has thus provided systems and methods enabling the delivery of a transport stream to a service provider utilizing a legacy video distribution system without requiring the usage of privately-owned point-to-point connections, such as fiber optic circuits, and without requiring changes in the existing equipment of the service provider. The system is preferably implemented, at least in part, as an adaptive stream concatenation server, which can be utilized in conjunction with adaptive streaming delivery architectures used with existing or legacy cable TV and IPTV system delivery networks deployed by service providers. In the above-described exemplary embodiments, the adaptive stream concatenation server is configured to utilize adaptive stream technologies in the generation of such transport streams to reliably and conveniently manage available resources of the distribution system, while providing multicast media streams to any number of existing television receivers. In this manner, the service provider can take advantage of the benefits of adaptive streaming technologies even when deploying a legacy delivery system, such as an RF QAM or an IP network, including terminal devices that generally cannot be loaded with an adaptive client.

In one embodiment, the above-described adaptive stream concatenation server is subscribed to the playlist files for multiple streams simultaneously to gain access to the HTTP-delivered "streamlets" that make up the adaptive streams for each channel. For each television channel, the server decrypts the streamlet segments and concatenate them as, for example, an MPEG2 Transport Stream. Stated differently, the adaptive stream concatenation server may concatenate the contents of each of the separate adaptive media streams into separate transport streams. The adaptive stream concatenation server then encapsulates the MPEG Transport streams into multicast IP streams, such as UDP or RTP multicast IP streams, which are easily routed to the service provider's existing headend solution. The encapsulated programming is then encrypted, modulated in cases of RF delivery, and distributed to the existing service provider's customer base thereby providing the reliable distribution of television programming distribution without change in equipment or distribution system architecture of the service provider. The adaptive stream concatenation server thus enables adaptive delivery of television programming to client devices (e.g., the television receivers) of a service provider in a cost effective manner by leveraging the ability to stream media content over the Internet or other digital network.

In the above-described exemplary embodiments, the ASC server was primarily described as concatenating the contents of a number of adaptive media streams to produce a concatenated transport stream provided to a distribution network as part of a larger streaming service; however, in further embodiments, ASC server may instead concatenate the contents of a number of adaptive streams to produce a transport concatenated stream, which is then distributed to one or more components in a user's or subscriber's home environment. In this case, the ASC server may be implemented in hardware, software, and/or firmware installed on a residential gateway device, such as a satellite receiver, deployed in a subscriber's home and serviced by a service provider. Such a residential gateway device may already serve as the demarcation point between the service provider's network and the subscriber's in-home network to provide such functions as television tuning services and distribution of those services throughout the home, video storage enabling whole-home access to Digital Video Recordings set-up by the subscriber, accessing a high speed data network provided by the service provider, routing traffic to the subscriber's devices, providing voice service demarcation for the home, and so on. In such embodiments, the service provider may now also transmit a number of adaptive streams through their distribution network to the home residential gateway device functioning as the ASC server. As the server receives these adapted media streams containing television programming in an adaptive packet format, the ASC server concatenates the adaptive streams received to produce a concatenated transport stream containing a multi-channel television content or programming, such as a cable television signal, in the previously-described manner. The ASC server then provides the concatenated transport stream of a video distribution system of some type, which may assume the form of, for example, a wireless signal distribution system (e.g., a wireless router included in the subscriber's in-home or local area network) or a hard line distribution system (e.g., co-axial cable router). The video distribution system then provides the transport stream containing the multi-channel television programming to one or more devices within the user's home that might not otherwise be capable of receiving adaptive streams, such as one or more legacy television sets or receivers located in one or more rooms of the subscriber's home.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A method executable by an adaptive stream concatenation server to deliver a concatenated transport stream to a video distribution system, the method comprising:
   receiving first and second adaptive media streams containing television programming in an adaptive packet format at the adaptive stream concatenation server via a digital network, the first adaptive media stream containing at least a first television channel, and the second adaptive media stream containing at least a second television channel;
   prior to or while receiving the first and second adaptive media streams, transmitting requests over the digital network to vary encoding parameters and bandwidth of the first and second adaptive media streams in response to changes in current system resources;
   concatenating contents of the first adaptive media stream with the contents of the second adaptive media stream at the adaptive stream concatenation server to create a concatenated transport stream containing multi-channel television programming in a streaming format that is not an adaptive packet format and that is compatible with the video distribution system;
   transmitting the concatenated transport stream containing the television programming in the streaming format to a headend of the video distribution system; and
   from the headend of the video distribution system, delivering the television programming to a plurality of set-top boxes distributed throughout guest rooms of a resort.

2. The method of claim 1 wherein transmitting requests comprises transmitting the requests to vary the encoding parameters and bandwidth of the first and second adaptive media streams to a network server or to at least one adaptive encoder.

3. The method of claim 1 wherein the television programming comprises a plurality of television channels, wherein the receiving comprises receiving a separate adaptive media stream for each of the plurality of channels, and wherein the concatenating comprises concatenating the contents of each of the separate adaptive media streams into separate transport streams.

4. The method of claim 1 wherein the video distribution system is a television distribution system and wherein the transport stream is modulated for radio frequency (RF) delivery to a cable television headend associated with the television distribution system.

5. The method of claim 1 further comprising encrypting the transport stream prior to transmitting the transport stream to the video distribution system.

6. The method of claim 1 further comprising subscribing the adaptive stream concatenation server to a play list for multiple adaptive media streams.

7. The method of claim 1 further comprising encapsulating the concatenated transport stream as a multicast Internet Protocol ("IP") stream.

8. The method of claim 7 wherein transmitting comprises routing the multicast IP stream to a headend distributor of the video distribution system.

9. The method of claim 7 wherein multicast IP stream is encapsulated in accordance with a protocol selected from the group consisting of User Datagram Protocol or Real-time Transport Protocol.

10. The method of claim 1 wherein transmitting requests comprises transmitting requests over the digital network to vary one or more encoding parameters of the first and second adaptive media streams selected from the group consisting of a bit rate, a frame rate, and a resolution.

11. The method of claim 1 wherein transmitting requests comprises transmitting requests over the digital network to a network server storing a library of content comprising video and audio segments encoded to different parameters by a plurality of adaptive encoders, which communicate with the network server over the digital network.

12. The method of claim 1 wherein transmitting requests comprises transmitting requests over the digital network to at least one adaptive encoder to provide the first and second adaptive media streams encoded to have a selected one of a low, high, or intermediate bandwidth.

13. The method of claim 1 wherein the first and second television channels are obtained from a content provider having a satellite footprint, and wherein the headend of the video distribution system is located outside of the satellite footprint.

14. An adaptive stream concatenation server to provide television programming for distribution to a plurality of television receivers by a video distribution system, the adaptive stream concatenation system comprising:
   an interface to a digital network;
   a processor configured to:
      receive a first adaptive media stream containing at least a first television channel in an adaptive packet format at the adaptive stream concatenation server via a digital network;
      receive a second adaptive media stream containing at least a second television channel in an adaptive packet format at the adaptive stream concatenation server via the digital network;
      prior to or while receiving the first and second adaptive media streams, transmit requests over the digital network to vary encoding parameters and bandwidth of the first and second adaptive media streams in response to changes in current system resources;
      concatenate the contents of the first adaptive media stream with contents of the second adaptive media stream at the adaptive stream concatenation server to create a concatenated transport stream containing multi-channel television programming in a streaming format that is not an adaptive packet format and that is compatible with the video distribution system; and
      transmit the concatenated transport stream containing the television programming in the streaming format to the video distribution system.

15. The adaptive stream concatenation server of claim 14 wherein the processor is further configured to modulate the transport stream for radio frequency (RF) delivery to a cable television headend associated with the television distribution system.

16. The adaptive stream concatenation server of claim 14 wherein the processor is further configured to:
   encapsulate the concatenated transport stream as a multicast Internet Protocol ("IP") stream; and
   route the multicast IP stream to a headend distributor of the video distribution system.

17. The adaptive stream concatenation server of claim 14 wherein the adaptive stream concatenation server is implemented in a residential gateway device located within a user's home, and wherein the processor is further configured to distribute the concatenated transport stream to at least one television receiver located within the user's home.

18. The adaptive stream concatenation server of claim 17 wherein the residential gateway device comprises a satellite receiver.

* * * * *